US006654481B2

(12) United States Patent
Amemiya et al.

(10) Patent No.: US 6,654,481 B2
(45) Date of Patent: Nov. 25, 2003

(54) MOBILE OBJECT COMBINATION DETECTION APPARATUS AND METHOD

(75) Inventors: Hirokazu Amemiya, Ebina (JP); Toshihide Saga, Kamakura (JP); Shinji Hashimoto, Kamakura (JP); Yasuyuki Ooki, Yokohama (JP)

(73) Assignees: Hitachi, Ltd., Tokyo (JP); Akita Electronics, Co., Ltd., Minamiakita-gun (JP)

( * ) Notice: Subject to any disclaimer, the term of this patent is extended or adjusted under 35 U.S.C. 154(b) by 52 days.

(21) Appl. No.: 09/832,136

(22) Filed: Apr. 11, 2001

(65) Prior Publication Data

US 2001/0012379 A1 Aug. 9, 2001

Related U.S. Application Data

(62) Division of application No. 09/182,436, filed on Oct. 30, 1998.

(30) Foreign Application Priority Data

Oct. 31, 1997 (JP) .......................................... 09-299948

(51) Int. Cl.[7] .................................................. G06K 9/00
(52) U.S. Cl. ....................................... 382/103; 348/169
(58) Field of Search ........................... 302/103; 348/169

(56) References Cited

U.S. PATENT DOCUMENTS 4,959,802 A 9/1990 Slaughter et al.
5,721,692 A * 2/1998 Nagaya et al. .............. 342/179
5,729,471 A 3/1998 Jain et al.
5,884,042 A 3/1999 Winter et al.
5,917,958 A * 6/1999 Nunally et al. ............. 348/139
5,963,664 A 10/1999 Kumar et al. ............... 382/154
5,987,154 A 11/1999 Gibbon et al.
6,011,901 A 1/2000 Kirsten

* cited by examiner

*Primary Examiner*—Jayanti K. Patel
*Assistant Examiner*—Barry Choobin
(74) *Attorney, Agent, or Firm*—Antonelli, Terry, Stout & Kraus, LLP

(57) ABSTRACT

A mobile object combination detection apparatus includes a plurality of moving image input units, a plurality of mobile object detection units each connected to one of the moving image input units, and a combination determination unit. Each of the plurality of mobile object detection unit detects a mobile object at a predetermined position on a moving image inputted thereto from the moving image input unit, and sends detection information to the combination determination unit. The combination determination unit compares the detection information of the mobile object sent thereto from each of the mobile object detection unit with a predetermined condition to determine that a target mobile object is detected when the detection information satisfies the predetermined condition.

3 Claims, 14 Drawing Sheets

MOBILE OBJECT COMBINATION DETECTION APPARATUS AND METHOD

CROSS-REFERENCE TO RELATED APPLICATION

This is a division of application Ser. No. 09/182,436 filed on Oct. 30, 1998, the contents of which are hereby incorporated herein by reference in their entirety.

BACKGROUND OF THE INVENTION

1. Field of the Invention

The present invention relates generally to an apparatus for detecting mobile objects from a moving image inputted from a camera, and more particularly to an apparatus and method which combine information detected from a plurality of moving images or information detected from a plurality of locations in a single moving image for detection of invaders, measurement of speed or the like.

2. Description of the Related Art

At present, a variety of places such as roads, railroad crossings, service floors in banks, or the like are monitored through video images produced by cameras. These are provided for purposes of eliminating traffic jams and obviating accidents and crimes by monitoring objects (mobile objects) in such particular places. There is extremely high needs for monitoring such mobile objects through video images. However, the current video monitoring still cannot go without resorting to intervention of man power due to technical problems. Thus, automated monitoring processing through a computer or the like is needed in view of the situation mentioned.

As a previously proposed method of detecting a mobile objects, U.S. Pat. No. 5,721,692 describes "MOVING OBJECT DETECTION APPARATUS." This patent realizes detection and extraction of a mobile object and a reduction in video processing time with a complicated background. A method employed in this patent will be explained below with reference to FIG. 2.

In FIG. 2, frame images F1 (241) to F5 (245) represent frame images of a video inputted from time T1 (221) to time T5 (225). A line segment S (231) drawn in each frame image of FIG. 2 specifies a target area to be monitored within the input video as a line segment. Hereinafter, this linear target area is referred to as the slit. Pairs in images 201 to 205 in FIG. 2 each represent an image on the slit S (hereinafter referred to as the slit image) and a background image from time T1 (221) to time T5 (225). In this example, a background image at the beginning of the processing is set to be an image of the target area to be monitored when no mobile object has been imaged by the camera.

This method performs on each frame image the following processing steps of: (1) extracting a slit image and a background image in a particular frame; (2) calculating the amount of image difference between the slit image and the background image by an appropriate method such as that for calculating the sum of squares of differences between pixel values in the images or the like; (3) tracing the amount of image difference in a time sequential manner to determine the existence of a mobile object if the amount of image difference transitions along a V-shaped pattern; and (4) determining that the background image has been updated when the amount of image difference has not varied for a predetermined time period or more and has been flat.

The foregoing step (3) will be explained in detail with reference to a sequence of frame images in FIG. 2. As shown in this example, when an object crosses the slit, the amount of image difference transitions along a V-shaped curve as illustrated in an image changing amount graph (211) of FIG. 2. First, before the object passes the slit (time T1 (221)), the image on the slit S and the background image are substantially the same (201), thus producing a small amount of image difference. Next, as the object begins crossing the slit (time T2 (222)), the slit image becomes different from the background image (202) to cause an increase in the amount of image difference. Finally, after the object has passed by the slit (time T3 (223)), the amount of image difference again returns to a smaller value. In this way, when an object crosses the slit S, the amount of image difference exhibits a V-shaped curve. It can be seen from the foregoing that a V-shaped portion may be located to find a mobile object, tracing the amount of image difference in a time sequential manner. In this example, the V-shaped portion is recognized to extend from a point at which the amount of image difference exceeds a threshold value a (213) to a point at which the amount of image difference subsequently decreases below the threshold value a (213).

Next, the foregoing step (4) will be explained with reference again to the sequence of frame images in FIG. 2. As shown in this example, when a baggage (252) or the like is left on the slit (time T4 (224)), the amount of image difference increases. However, the amount of image difference remains at a high value and does not vary (from time T4 (224) to time T5 (225)) since the baggage (252) remains stationary. In this method, when the amount of image difference presents a small fluctuating value for a predetermined time period, a slit image at that time is employed as an updated background.

As explained above, since U.S. Pat. No. 5,721,692 can use a line segment as a target area for which the monitoring is conducted, a time required to calculate the amount of image difference can be largely reduced as compared with an earlier method which monitors an entire screen as a target area. Also, since this method can find the timing of updating the background by checking time sequential variations of the amount of image difference, the monitoring processing can be applied even to a place at which the background can frequently change, such as an outdoor video or the like.

However, when the above-mentioned prior art method is simply utilized, the following problems may arise.

A first problem is that only one target area for monitoring can be set on a screen.

A second problem is the inabilities of highly sophisticated detection and determination based on the contents of a monitored mobile object, such as determination on a temporal relationship of detecting times of a mobile object, determination on similarity of images resulting from the detection, and so on.

SUMMARY OF THE INVENTION

A mobile object combination detection apparatus according to the present invention comprises a plurality of sets of a unit for inputting a video and a unit for detecting a mobile object from the input video, a mobile object combination determination unit for combining mobile object detection results outputted from the respective sets to determine the mobile object detection results, and a unit for outputting the detected results.

When each of the mobile object detection unit detects an event such as invasion of a mobile object, an background update, and so on, the mobile object detection unit outputs mobile object detection information including an identifier of the mobile object detection unit, detection time, the type of detected event, and an image at a slit used for determining the detection. The mobile object combination determination unit determines final detection of a mobile object through total condition determination from the information outputted from the respective mobile object detection units.

Figure 1:
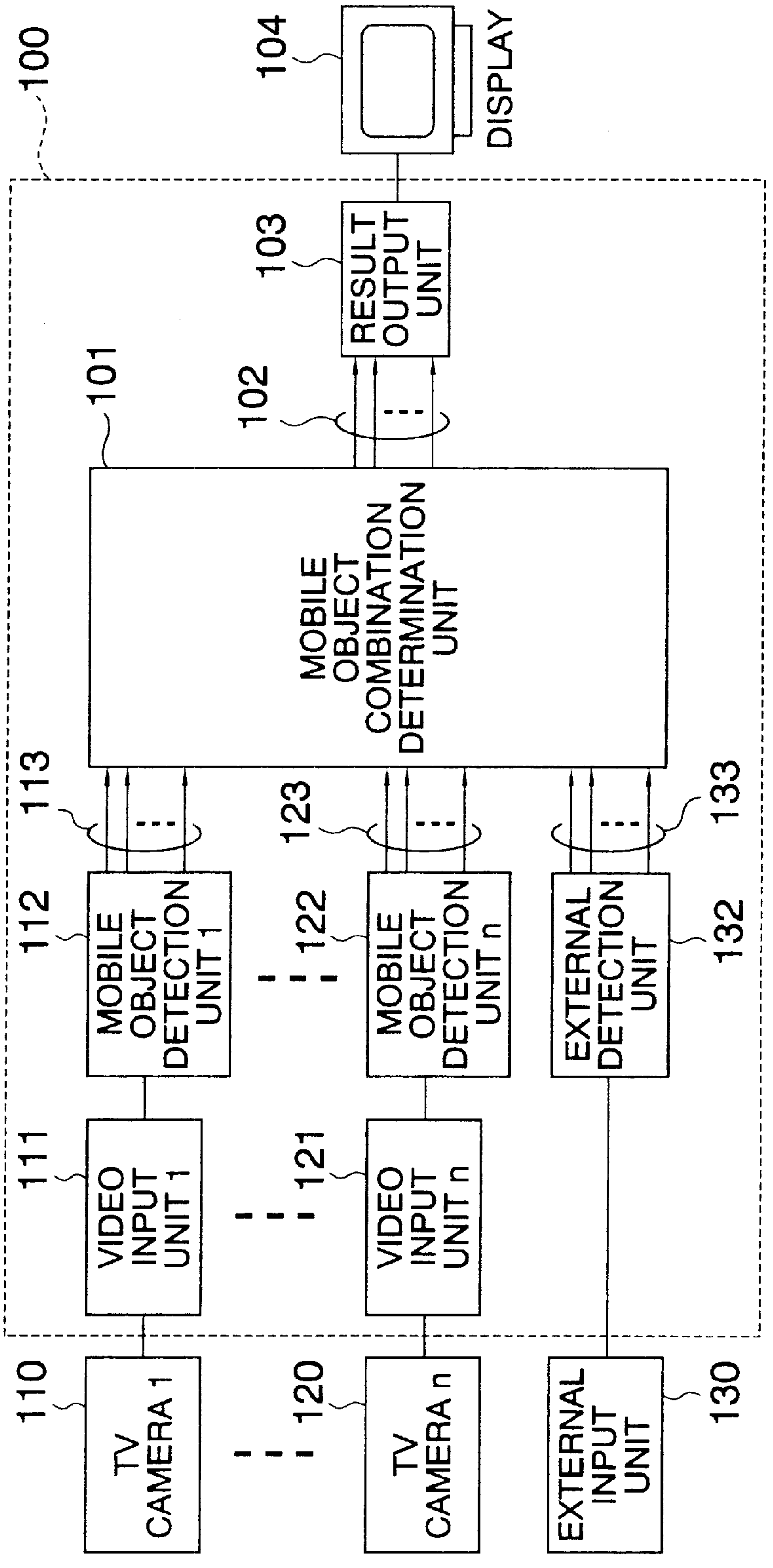
FIG. 1 is a block diagram illustrating the configuration of a mobile object combination detection apparatus according to a first embodiment of the present invention.

DESCRIPTION OF THE PREFERRED EMBODIMENTS (1) First Embodiment

As a first embodiment, a mobile object detection apparatus using a plurality of moving images will be described with reference to FIG. 1.

The internal configuration of a mobile object combination detection apparatus (100) in FIG. 1 will be described. The mobile object combination detection apparatus (100) is composed of the following units. Video input units from a first video input unit 1 (111) to an n-th video input unit n (121) read video images created by a plurality of video creating apparatus including a TV camera 1 (110) to a TV camera n (120) into the mobile object combination detection apparatus (100). A video created by the TV camera 1 (110) is inputted to the video input unit 1 (111), and in the following, a video created by an i-th TV camera i is inputted to a corresponding video input unit i, where the number i takes values from 1 to n, in a similar manner. Next, the video read into the video input unit 1 (111) is inputted to a mobile object detection unit 1 (112) as a sequence of frame images constituting the video for detecting whether or not a mobile object is present. In the following, in an i-th mobile object detection unit i, a video read into the video input unit i is similarly inputted to a mobile object detection unit i for detecting whether or not a mobile object is present.

The mobile object detection units (112, 122) each calculate a correlation between data on a target area in a particular inputted frame and data on a target area in each frame, and determines, from patterns of at least one calculated correlated values, a mobile object detection event such as the presence or absence of a mobile object, a change in background image, and so on. It should be noted that the target area is a closed area and may take a circular shape, a rectangular shape, a slit-like shape, or the like. For realizing the determination of such mobile object detection event, this embodiment utilizes the method illustrated in FIG. 2 which has been described as the related art.

Each of the mobile object detection units (112, 122) outputs a mobile object detection event as a signal or data (113, 123) at timing described below.

Figure 2:
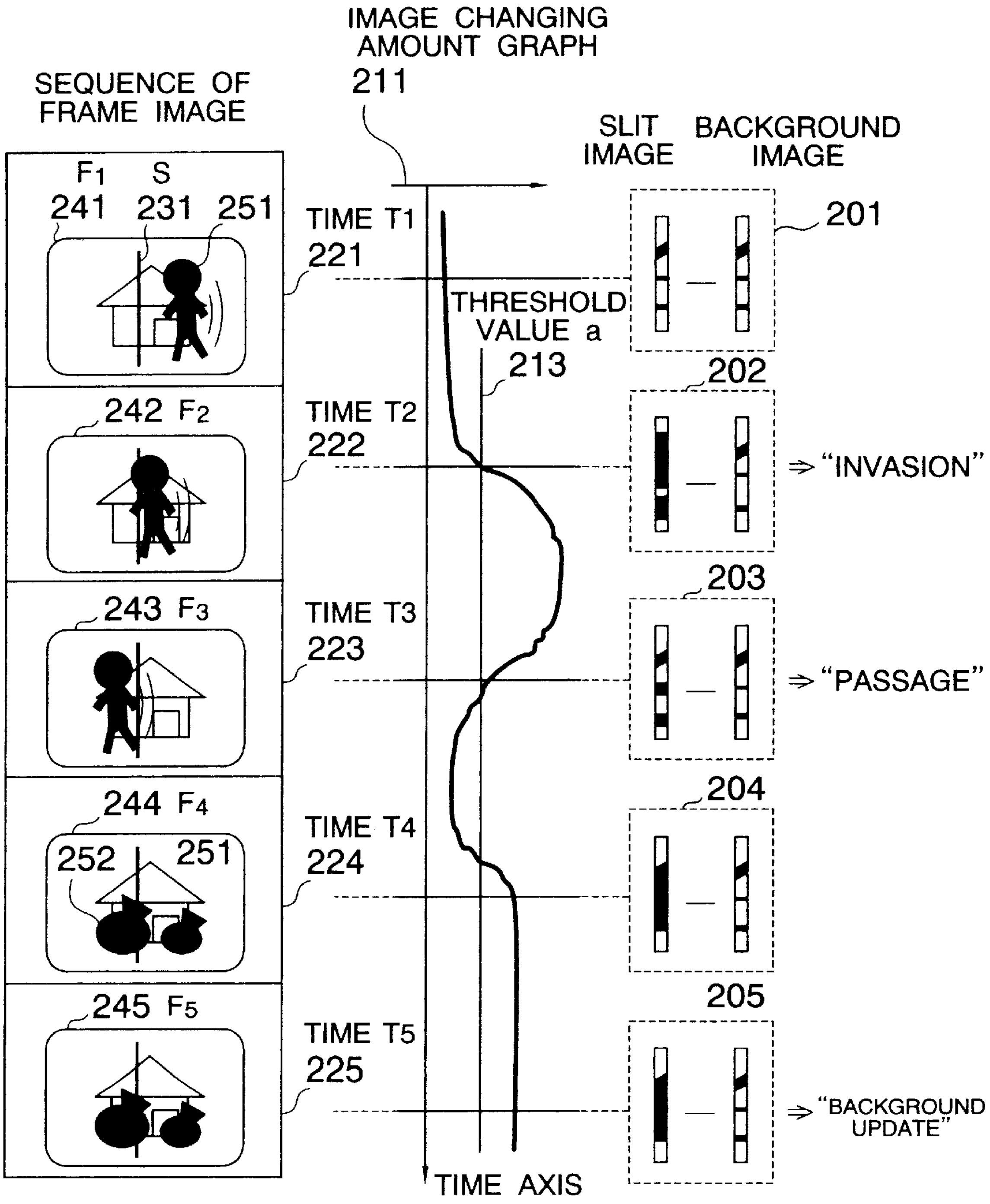
FIG. 2 shows diagrams for explaining a mobile object detection method in a mobile object detection unit.

① Each of the detection units detects a time point at which a mobile object comes in contact with a slit as a time point (time T2 (222)) at which an image changing amount or the amount of image difference in FIG. 2 exceeds a threshold value a (213), and outputs this as an "invasion" event.

② Each of the detection units detects a time point at which the mobile object has passed the slit as a time point (time T3 (223)) at which the image changing amount has once exceeded the threshold value a (213) and again decreases below the threshold value a (213), and outputs this as a "passage" event.

③ Each of the detection units detects a time point at which the background has been updated as a time point (time T5 (225)) at which the image changing amount once exceeded the threshold value a (213) and has remained unchanged for a predetermined time period, and outputs as a "background update" event.

Upon detecting any of the events mentioned above, each of the mobile object detection units (112, 122) sends a mobile object detection unit identifier (or a slit ID), an event type and occurring time to the mobile object combination determination unit (101). In this event, the mobile object detection units may send pointers to a slit image (411 in FIG. 4), a background image (412 in FIG. 4) and a frame image (413 in FIG. 4), used to detect a mobile object, to the determination unit (101) together with the above-mentioned information.

An external input unit 130 is a device for generating a signal under certain conditions, such as a sensor using infrared rays, a speed sensor or the like. An external detection unit 132, upon receiving a signal from the external input unit 130, sends an external detection unit identifier, an event type and occurring time to the mobile object combination determination unit (101). In this event, the event type may be “detection,” “passage” or the like, although depending on the external input unit (130).

Figure 4:
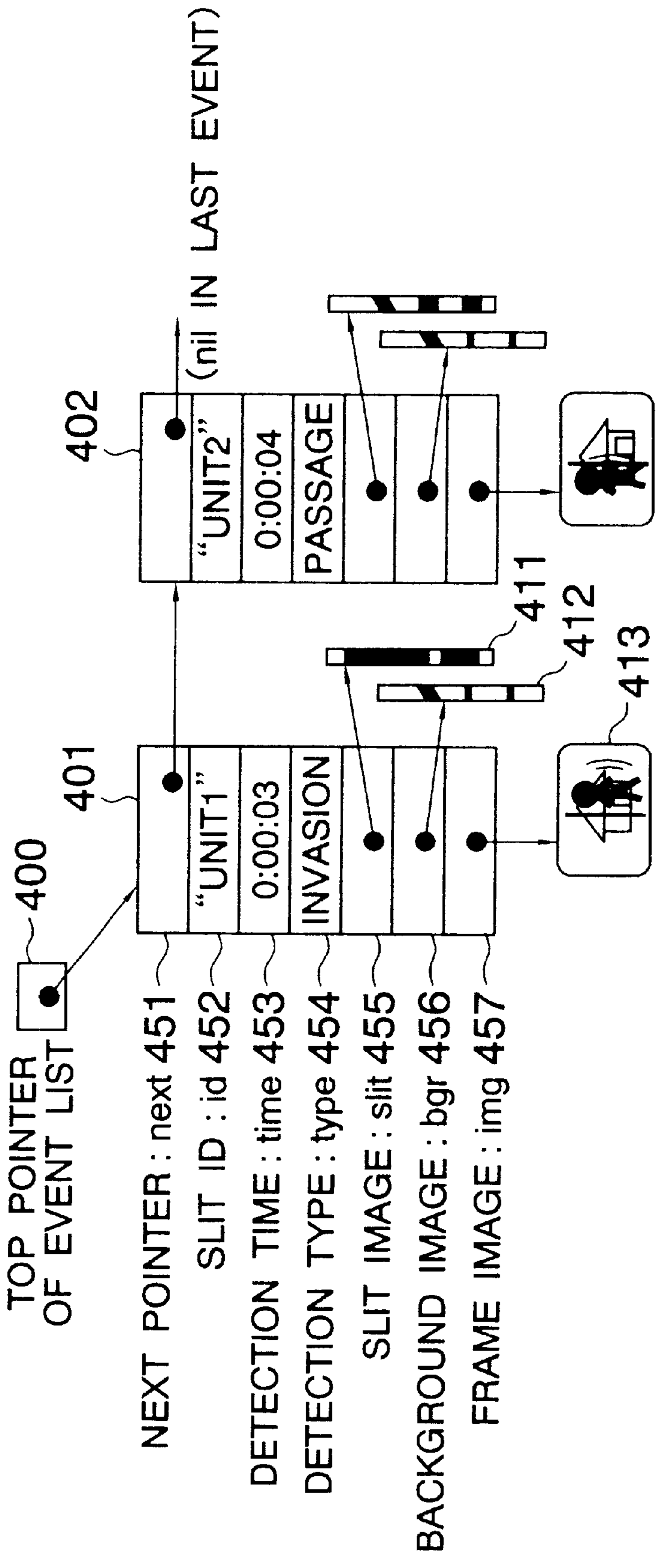
FIG. 4 is a diagram illustrating the structure of a sequence of mobile object detection events (an event list) contained in the mobile object combination determination unit.

The mobile object combination determination unit (101) preserves mobile object detection information inputted thereto from all of the mobile object detection units and the external input unit in a memory in the form of an event list illustrated in FIG. 4. The event list contains mobile object detection information, i.e., event information inputted from all the detection units, wherein the latest event information is pointed from a top pointer 400. Each event information is composed of an mobile object detection unit identifier (id 452) (or a slit ID); detected time (time 453); a type (type 454) of a mobile object detection event; a pointer (slit 455) to a slit image used for the mobile object detection processing; a similar pointer (bgr 456) to a background image; and a similar pointer (img 457) to an entire frame image, as shown in one element within the event list of FIG. 4. The pointers 455–457 to the images may be blank.

Next, the mobile object combination determination unit 101 determines to satisfy event information combination conditions for events outputted from the mobile object detection units and the external detection unit, makes a determination, and outputs the determined result as a combined mobile object detection event (102). In a result output unit (103), the combined mobile object detection event (102) is presented to the user through a display device (104) or the like.

The video input unit may be implemented by a video input port of a computer such as a personal computer, and the mobile object detection unit and the external detection unit may be implemented by a CPU and a memory of a computer such as a personal computer and software programs executed by the CPU.

The mobile object combination determination unit and the result output unit may also be implemented by a CPU and a memory of a computer such as a personal computer and software programs executed by the CPU.

The plurality of mobile object detection units and the mobile object combination determination unit may be configured by a single CPU and memory. Also, a set of a video input unit and a mobile object detection unit may be configured by a single board including an analog/digital converter and a microprocessor, and implemented in a computer which includes the mobile object combination determination unit and the result output unit.

Figure 3:
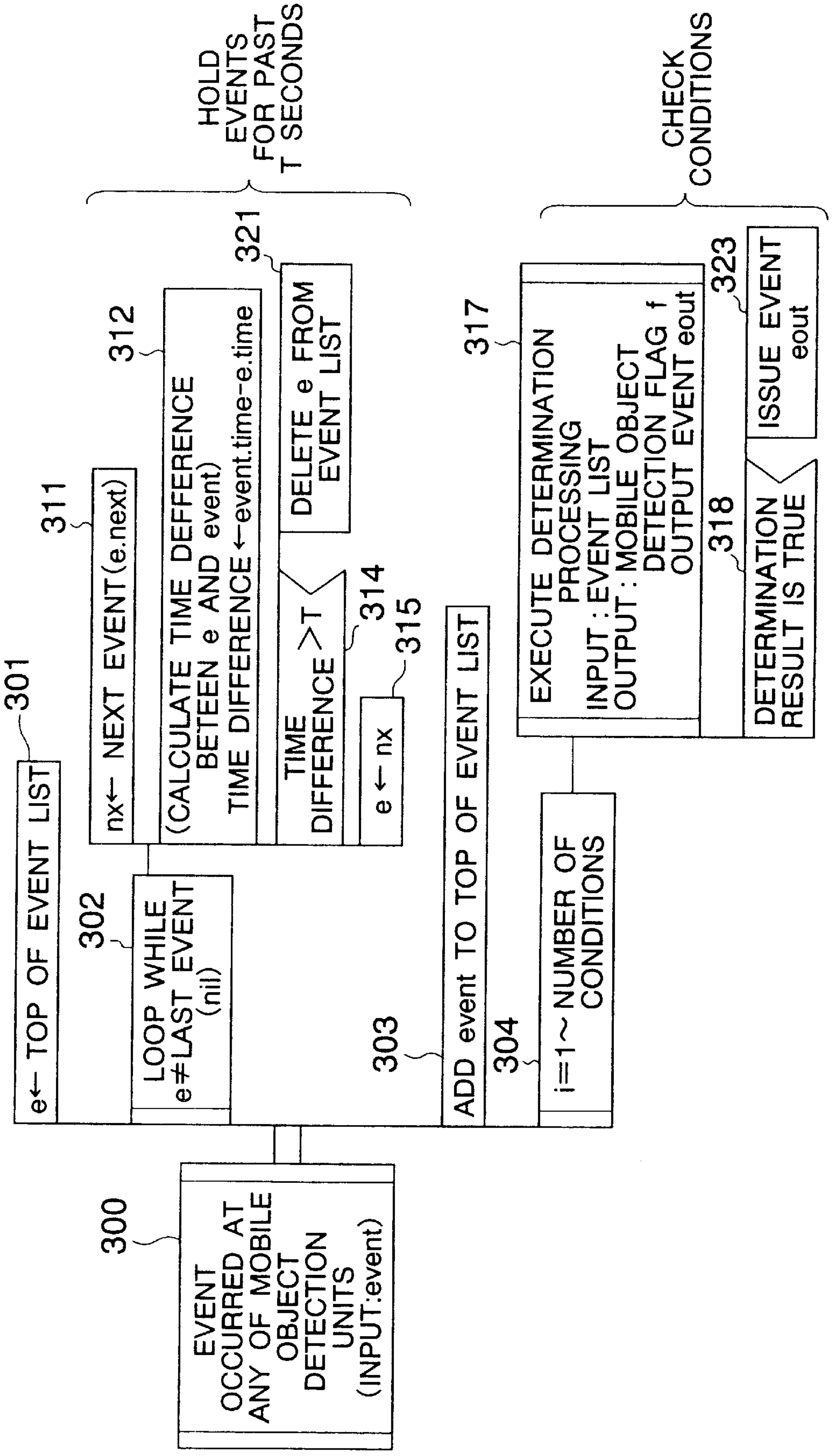
FIG. 3 is a processing flow diagram (HIPO: hierarchy plus input-process-output) for explaining a processing procedure for a mobile object combination determination unit in an embodiment of the present invention.

Next, the processing performed by the mobile object combination determination unit (101) will be explained in detail with reference to FIGS. 3 and 4. A procedure 300 in FIG. 3 is the processing which is executed when an event has occurred in any of the n mobile object detection units (112, 122) and the external detection unit (132) connected to the mobile object combination determination unit (101). Input data involved in this procedure is the event information (variable:event) mentioned above. FIG. 4 illustrates a sequence of mobile object detection events (an event list) contained by the mobile object combination determination unit. The event list stores a plurality of sets of mobile object detection information created by the respective aforementioned mobile object detection units in a list structure. The event list has a top pointer 400 which points to the top of the list, and stores a set of mobile object detection information as one element of the list structure, wherein respective elements are linked by pointers. In the example illustrated in FIG. 4, the event list has an element 401 and an element 402, as elements of the event list, which are linked in chain through the top pointer 400, a next pointer (next in a field 451) in the element 401, and so on.

The procedure 300 in FIG. 3 will be described along its steps. The procedure 300 is executed when a new event is informed by any one of detection units and the procedure is generally made up of two portions: processing for holding events for past T seconds and processing for determining to satisfy event combination conditions for the past T second events.

First, the processing portion for holding events for the past T seconds will be explained. The first item in the event is accessed using the top pointer of the event list, and the position (address) is substituted into a variable e representative of an event (301). Next, a loop of sequentially reading elements in the event list up to the bottom thereof is executed using the variable e (302). It is assumed that a value nil is contained in the next pointer field of the last element in the event list. In the loop (302), the following processing is performed.

First, the next element in the event list is saved in a temporary variable nx (311). Next, a difference between time (event.time) of an input event (event) and time (e.time) of a current list position e is calculated in order to reveal a time difference between the execution time of this processing and the occurrence time of the event e at the current list position (312). If the calculated time length is longer than a predetermined time length T (314), the event at that time is deleted from the event list (321). As the last processing in the loop 302, the previously saved next element position nx of the list is again substituted into the variable e of the event (315). Then, similar processing is repeated for the next element in the event list. When the processing in the loop is completed, the input event (event) is added to the top of the event list (302). By the following processing, older event information prior to the past T seconds in the event list is deleted therefrom, so that the event list has a time length equal to or shorter than T seconds. Also, the latest event is placed at the top of the event list.

Explanation is next given of the processing for determining to satisfy event combination conditions for the past T second events. In a loop 304, the following processing is repeated the number of times equal to the number of previously prepared event combination conditions, and a value indicative of how many times the loop has been repeated is set to a variable i (304). In the loop 304, determination processing is first executed for determining to satisfy an i-th condition within the previously prepared event combination conditions (317). This determination processing (317) may be any of various processings depending on the contents of mobile objects which are to be detected by the mobile object combination detection apparatus. In this example, the previously created event list having the time length of T seconds is provided as an input to the determination processing 317, and a flag indicative of whether or not a mobile object is detected, and mobile object detection information (eout) on an mobile object, if detected, are derived as outputs of the determination processing 317. After the determination processing 317, if a determination result is true (318), a mobile object detection event is issued, and the mobile object detection information (eout) derived by the determination processing 317 is outputted as mobile object detection information thereon.

By repeating the processing described above the number of times equal to the number of previously prepared event combination conditions, a plurality of types of mobile object detection events can be retrieved from a single event list. It should be noted that while in FIG. 3, the processing 304 for determining to satisfy an event combination condition is performed every time an event occurs, the processing 304 may be performed at any appropriate timing independent of the occurrence of an event (for example, at timing specified by the operator or the like).

As a specific example, a security system for a bank is discussed below. Referring again to FIG. 1, the security system has three TV cameras disposed near a gate 1, a gate 2 and an emergency exit, respectively. An infrared sensor is disposed at an entrance of a vault as an external input unit. In this event, the time length T of an event list is set to five minutes, and an event combination condition is defined to be {slitID="gate 1", detection type="invasion" OR slitID="gate 2", detection type="invasion" OR slitID="emergency exit", detection type="invasion" OR slitID="infrared sensor", detection type="detected"}. If this condition is satisfied, the mobile object combination determination unit displays an alarm on the display and generates a buzzer through the result output unit. Stated another way, when a mobile object is detected at any of the three entrance and the entrance of the vault, the mobile object combination determination unit determines an emergency. The event combination condition may further include additional conditions such as a time difference between times at which two events have been detected, and a temporal relationship of the two events indicating which of them occurred first. The determination unit compares variables of all events in the event list with the event combination condition to determine whether the event combination condition is satisfied.

(2) Second Embodiment

Next, a mobile object counting apparatus will be described as a second embodiment.

Figure 5:
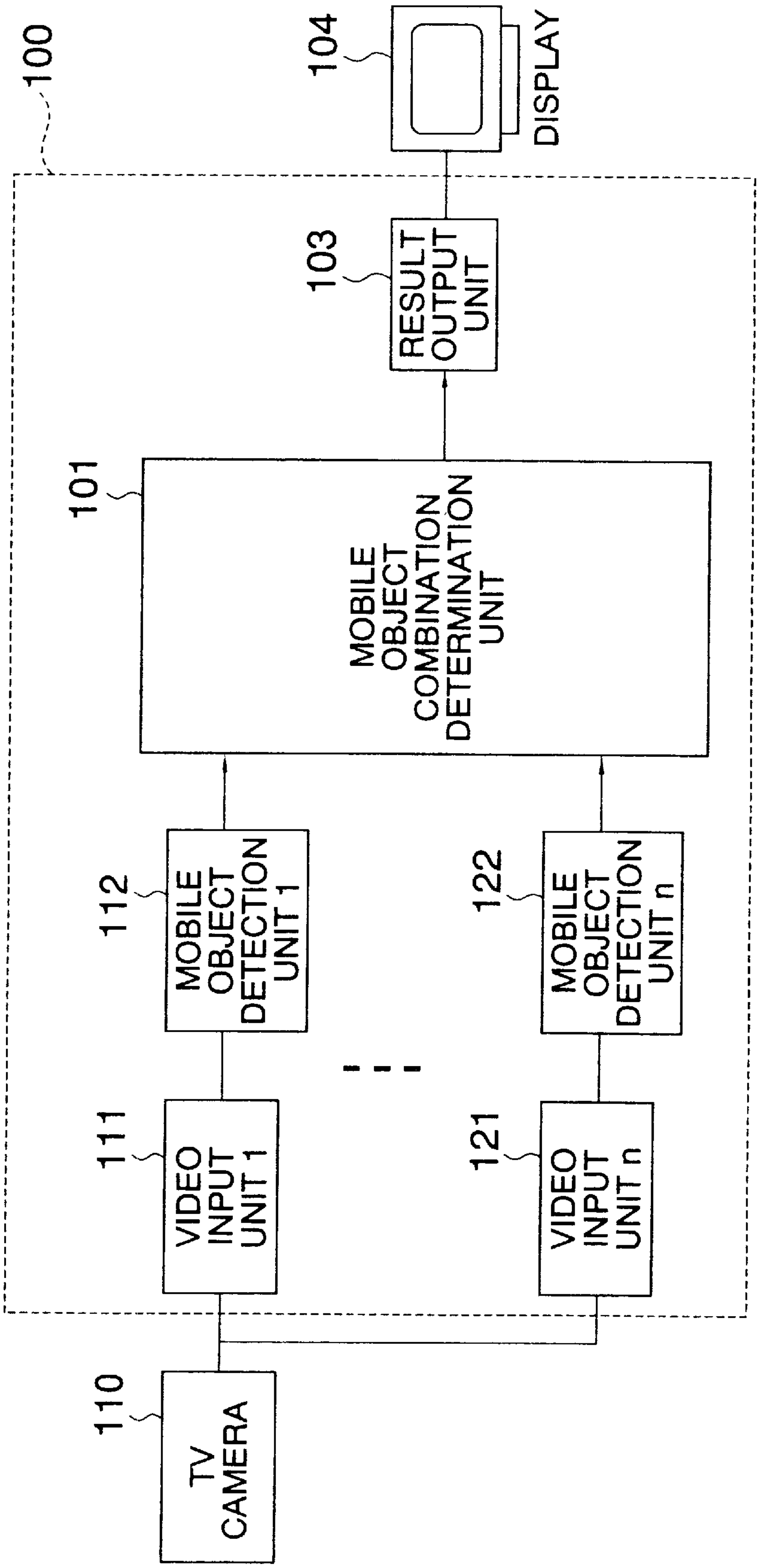
FIG. 5 is a block diagram illustrating a system configuration of a mobile object combination detection apparatus using a single TV camera according to a second embodiment of the present invention.
Figure 6:
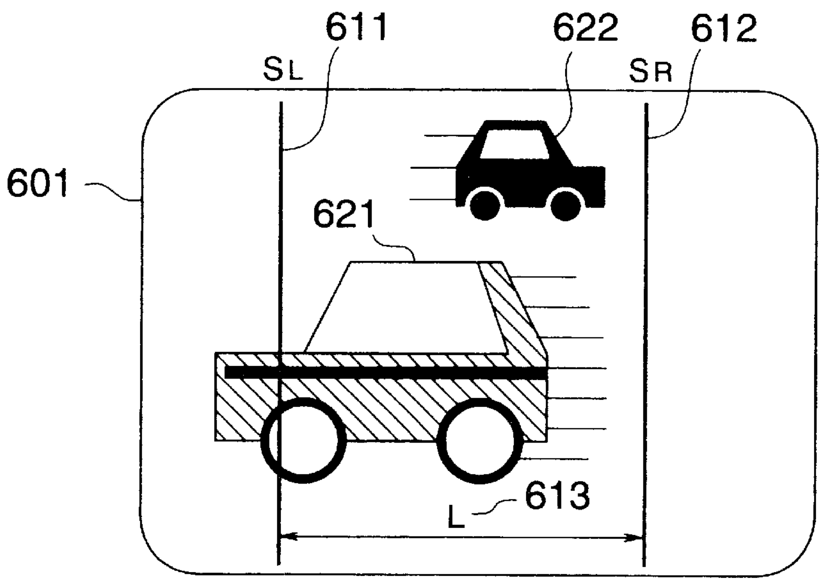
FIG. 6 is a diagram for explaining how a moving direction and a speed of a mobile object are determined using two slits in the second embodiment.

FIG. 5 illustrates an example of a system configuration, different from that illustrated in FIG. 1, which allows a plurality of slits to be specified within a video image produced by a single TV camera (110), as illustrated in FIG. 6. With this configuration, a moving direction and a speed of a mobile object found in the TV camera can be detected using n mobile object detection units corresponding to n slits. In this example, while n video input units (111, 121) are supplied with an image from the same TV camera (110), the input image is processed by n mobile object detection units (112, 122) corresponding to the respective video input units. A mobile object combination determination unit 101 eventually determines detection of a mobile object based on outputs from the n mobile object detection units (112, 122), and presents the determination result to the user using a display device 104 through a result output unit 103.

FIG. 6 illustrates how two slits are specified in a method of determining a moving direction and a speed of a mobile object using the two slits. In this embodiment, a TV camera is oriented to image vehicles passing a road for traffic flow surveys. In this embodiment, the number n of video input units and mobile object detection units in FIG. 5 is chosen to be two. A video 601 produced by the TV camera 110 in FIG. 6 shows a vehicle 621 running to the left and a vehicle 622 running to the right. In this embodiment, two slits consisting of a slit SL (611) monitored by a mobile object detection unit 1 and a slit SR (612) monitored by a mobile object detection unit 2 are positioned in parallel with a distance L (in meters) (613) intervening therebetween.

Figure 7:
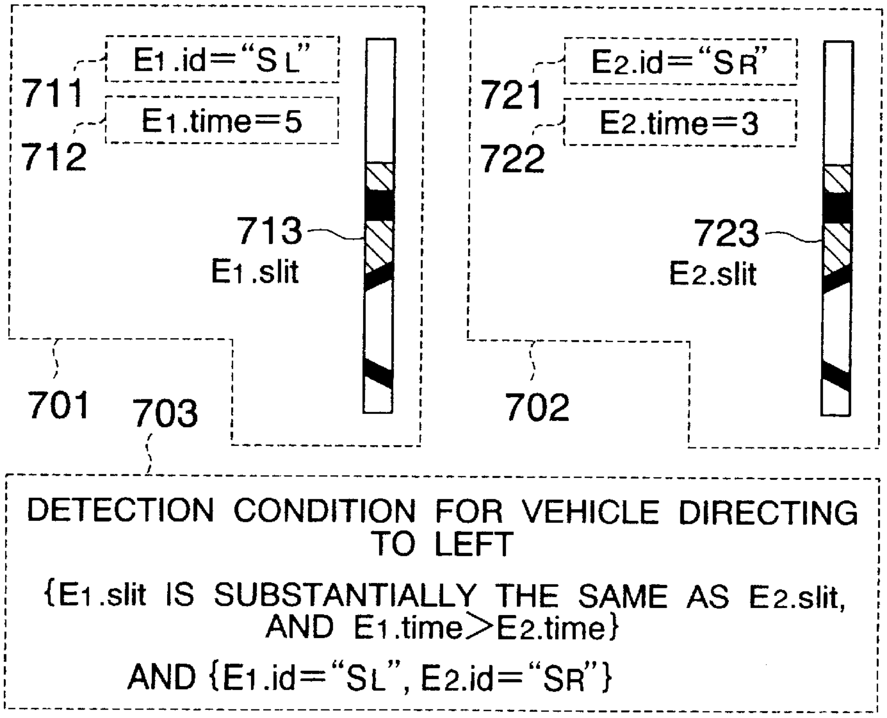
FIG. 7 is a diagram for explaining how an event combination condition is determined for a moving direction of a mobile object using two slits in the second embodiment.

Referring to FIGS. 6 and 7, explanation is next given of how a moving direction and a speed of a mobile object are actually determined, when the slits are positioned as illustrated in FIG. 6. Here, the vehicle 621 running to the left is taken as an example.

Assuming that the vehicle 621 appears from the right in the image 601 of the TV camera and runs toward the left in the image 601 of the TV image, it can be seen that a mobile object detection event "invasion" is first generated at the slit SR (612), i.e., at the mobile object detection unit 2, and then a mobile object detection event "invasion" is generated at the slit SL (611), i.e., at the mobile object detection unit 1 in a little while after the detection at the mobile object detection unit 2. Mobile object detection information associated with the two mobile object detection events generated in this example is such as mobile object detection information E1 (701) at the slit SL (611) and mobile object detection information E2 (702) at the slit SR (612), as shown in FIG. 7. The mobile object detection information records "3" which is the value of detection time (E2.time 722) at the slit SR (612) and "5" which is the value of detection time (E1.time 712) at the slit SL (611). It is understood from the foregoing that when a mobile object travels to the left, the left side detection time (E1.time 712) is always later than the right side detection time (E2.time 722). It is also understood that when a mobile object travels to the right, the converse to this is satisfied. It is therefore possible to determine the moving direction of a mobile object from temporal information as to when the mobile object is detected at the two slits.

Since it can be determined that the mobile object has passed between the slit SR (612) and the slit SL (611) in a time interval t calculated by t=E1.time −E2.time, the speed V of the mobile object is derived as V=L/t using the distance L (613) which has been previously measured.

With this method, however, if a mobile object turns back and returns in the opposite direction after it has reached a central position between the two slits, or if a plurality of mobile objects invade simultaneously into the scene, the correct determination cannot be made on a target mobile object. This defect is caused by the fact that this method fails to determine specific behaviors of a mobile object, for example, whether mobile objects passing the two slits are the same. By adding detailed conditions to the above example, it is possible to more correctly determine a moving direction and a speed of a mobile object.

First, the following parallel and orthogonal positioning condition is added to the aforementioned slit positioning condition. The slit SL (611) monitored by the mobile object detection unit 1 and the slit SR (612) monitored by the mobile object detection unit 2 are positioned in parallel with the distance L (in meters) (613) intervening therebetween, and oriented perpendicularly to the running directions of a mobile object 621 or a mobile object 622 or to the road. In this way, when a vehicle or the like passes the two slits, a slit image (E1.slit 713) of the slit SL (611) and a slit image (E2.slit 723) of the slit SR (612) present substantially the same images, so that it can be determined whether or not mobile objects passing the two slits are the same by calculating the similarity of the two slit images upon detecting the mobile objects.

The foregoing detection condition is defined by a conditional expression CL (703) for detecting a vehicle running to the left which describes {"E1.slit (713) and E2.slit (723) are substantially the same images AND E1.time>E2.time"}. It should be noted however that this conditional expression CL (703) is applied to a mobile object directing to the left, so that a restricting condition for an identifier of a detection event point {"E1.id (711)="SL" AND E2.id (721)="SR"} should be added to the conditional expression CL (703).

Figure 8:
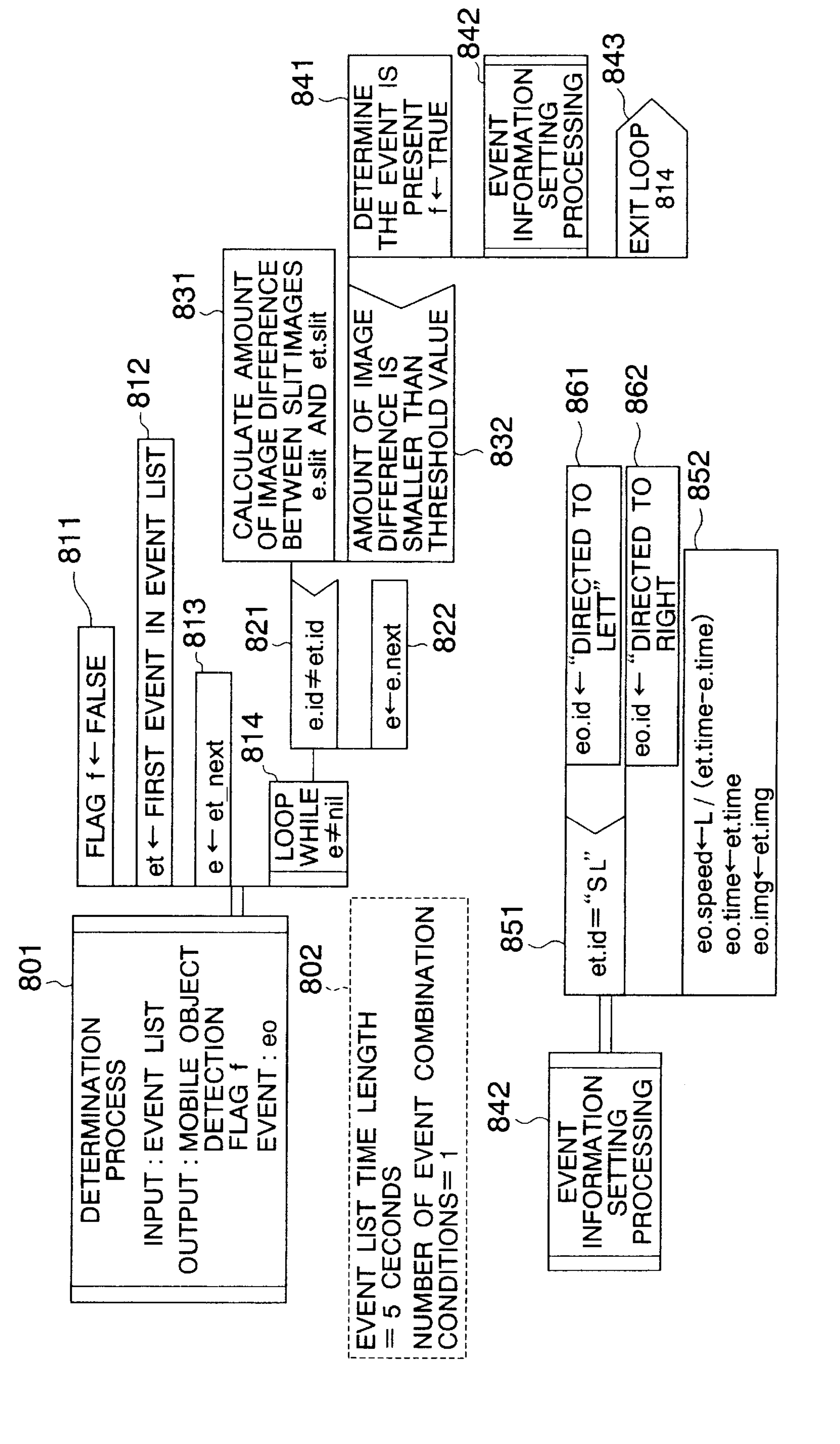
FIG. 8 is a processing flow diagram illustrating the processing for determining an event combination condition using two slit in the second embodiment.

Next, an actual processing flow for determining an event that satisfies the foregoing detection condition will be explained with reference to FIG. 8. A procedure 801 corresponds to the event combination condition determination processing (317) which has been explained above in connection with the processing flow for the mobile object combination determination unit in FIG. 3. The procedure 801 receives an event list for past T seconds as an input, and outputs a flag f indicative of the presence or absence of a mobile object and mobile object detection information eo for events in the event list. Also, in the method of detecting a moving direction and a speed of a mobile object of this embodiment, the time length T of the event list is set to five seconds, and the number of event combination conditions is set to one (802) for executing the event combination condition determination processing (317) in FIG. 3.

First, the mobile object presence/absence detection flag f is initialized to be false (811). Subsequently, the first event in the event list is set to an in-procedure temporary variable et (812). Next, the event list is scanned from the second event from the top to the last event using the in-procedure temporary variable e. For this purpose, the next pointer et.next of the first event in the event list is set to the variable e (813), and the following processing is repeated until the value of the variable e presents nil (814).

It should be noted in the aforementioned event combination condition determination processing (317) that the event list is updated such that the latest detection event is placed at the top of the event list, and more previous detection events are placed as the event list goes toward the end.

In a loop (814), an event identifier of the latest event et is first compared with that of an event e at a current position on the event list (821). The processing at step 831 onward is performed only when the two event identifiers present different values. Since the event identifier in this embodiment only takes either “SL” or “SR,” it is possible to determine from the event identifiers whether or not a mobile object had passed the slit on the opposite side before the time point at which the latest event et has occurred. When the processing proceeds to step 831, the amount of image difference between slit images e.slit and et.slit at the two event time points is calculated in order to determine whether or not the mobile object at the latest event et and the mobile object at the current list position e are the same (831). When the two mobile objects are the same, the slit images are substantially the same so that the amount of image difference becomes smaller. If the amount of difference is smaller than a threshold value (832), it is determined that a mobile object directing to the right or to the left is detected, and the mobile object detection flag f is set to true (841). Subsequent to step (841), mobile object detection information for output is set (842).

In the event information setting processing (842), the slit identifier of the latest event et is checked to determine whether a mobile object directing to the right or a mobile object directing to the left has been detected. If a mobile object is directing to the left, a detection event e at the slit SR (612) in FIG. 6 should first occur, and then a detection event et at the slit SL (611) should next occur. Therefore, when the event identifier et.id is “SL” (851), the detected event indicates that a mobile object is directing to the left. Consequently, “left direction” is stored in the identifier of the outputted mobile object detection information eo (861). Conversely, when the event identifier et.id is not “SL” (851), “right direction” is stored in the identifier of the outputted mobile object detection information eo (862). As the final step in the event information setting processing, the speed eo.speed of the mobile object, detection time eo.time, and a frame image img are set based on the latest event information et (852). For the speed eo.speed of the mobile object, the previously measured distance L (613) between the slits may be divided by the difference between the time of the latest event et and the time of the found event e, and the resultant value is substituted into the speed eo.speed.

When the event information setting processing (842) is completed, the loop 814 exits without further processing, concluding that the event can be detected (843).

Conversely, if the identifiers of the two events are the same (both of the identifiers are “SL” or the like) at step 821, or the amount of image difference is larger than the threshold value at step 832, it is determined that the event e at the current list position has detected a mobile object different from that detected in the latest mobile object detection event et, and the loop is continued while the event list is scanned toward the end thereof.

If no mobile object detection event is found corresponding to the latest mobile object detection event et even after the loop 814 has been executed to manipulate all events in the event list, it is determined that no mobile object is present, and the mobile object presence/absence detection flag f is set to false, followed by terminating the procedure 801.

Figure 9:
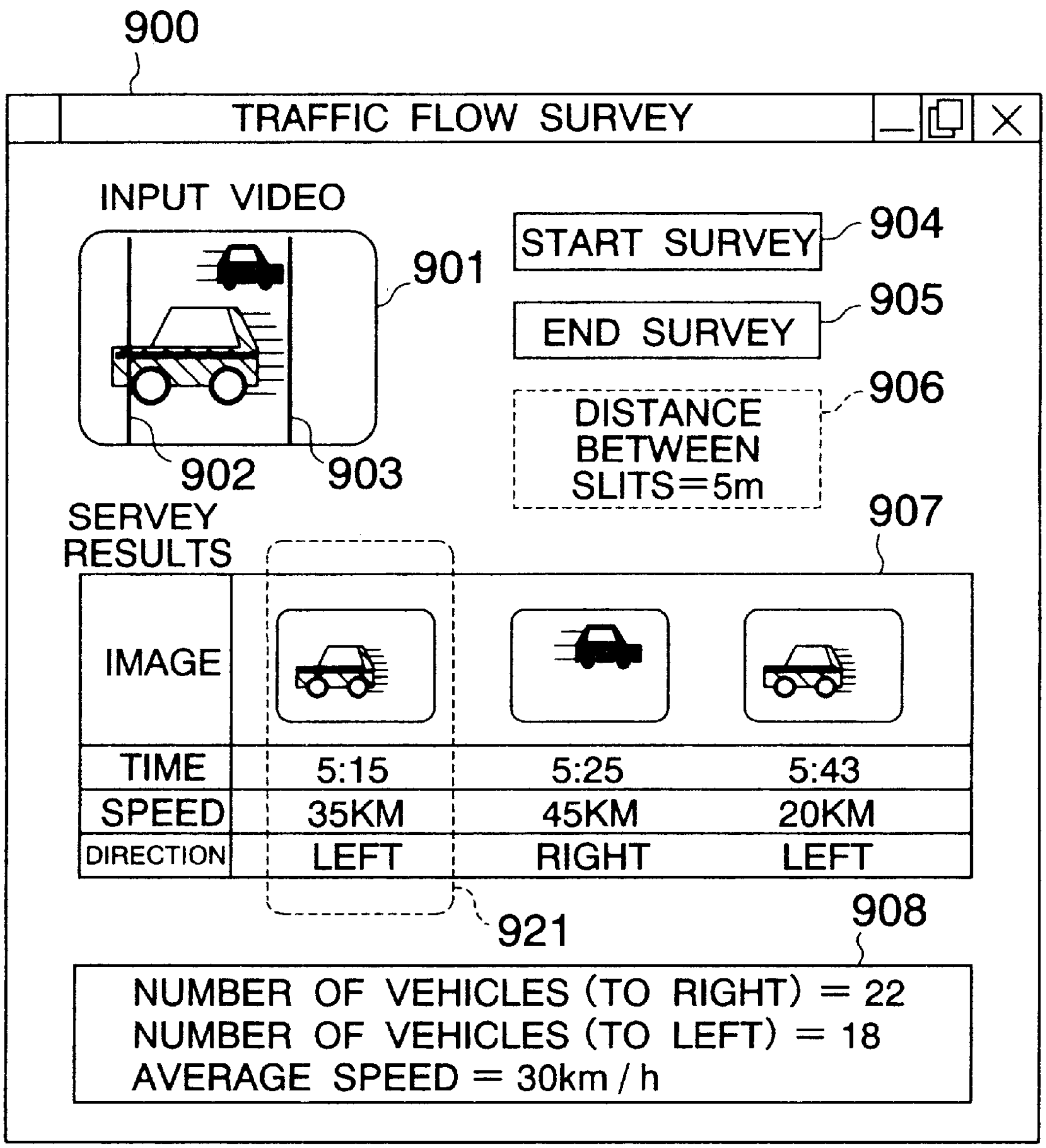
FIG. 9 is a diagram illustrating an exemplary output on a screen of a mobile object counting apparatus using two slots in the second embodiment.

FIG. 9 illustrates an example of instructions inputted to and an example of results outputted from a mobile object counting apparatus utilizing the above explained method of determining a moving direction and a speed of a mobile object. A window 900 is a region for displaying the results which may be displayed under the control of an operating system (OS) of a computer or the like.

The window 900 includes a field 901 for displaying an input video; a survey start button 904 for starting a survey of counting the number of mobile objects; a survey end button 905 for ending the survey; a field 906 for displaying the distance between two slits 902 and 903 specified in the input image 901 (the previously measured value of “5 m” is displayed in this example); a field 907 for displaying survey results on the latest three mobile objects including passage time, moving direction, speed and image for each of them; and a field 908 for displaying the number of mobile objects and an average speed of the mobile objects, which have been eventually determined.

It is assumed that the input image 901 and the positioning of the two slits 902, 903 in the image 901 are similar to those in FIG. 6. As the survey start button 904 is depressed, the processing involved in the survey of the moving direction, number and speed of mobile objects is started. When the survey end button 905 is depressed, the survey processing is ended.

The survey processing will be explained below in brief. Upon starting the survey, the number of vehicles or mobile objects directing to the right, the number of vehicles directing to the left, a total speed value are initialized to zero. Afterwards, as a mobile object is detected, mobile object detection information is updated and displayed in the result field 907. As a method of displaying the mobile object detection information employed in this example, the image of a detected mobile object, the mobile object detecting time, the speed of the mobile object, and the moving direction of the mobile object are displayed from the above in order, as indicated in an area surrounded by a dotted rectangle 921 in FIG. 9.

The processing performed when a mobile object is detected additionally includes processing for counting the number of vehicles directing to the right and the number of vehicles directing to the left; processing for calculating an average speed of detected mobile objects; and processing for displaying the results of the processing in the total result display field 908. The average speed of detected mobile objects may be calculated by accumulatively adding a speed value of a mobile object to a total speed value each time the mobile object is detected, and dividing the total speed value by the number of all mobile objects so far detected (the sum of the number of mobile objects directing to the right and the number of mobile objects directing to the left). The processing is continued until the survey end button 905 is depressed.

For the input video image 901 in FIG. 9, an image inputted by one of the video input units may be utilized, or an appropriate image may be displayed utilizing a frame image pointer which is reported in the latest event. Images in the survey results 907 in FIG. 9 are also displayed utilizing frame image pointers in events which have been used for the detection of mobile objects.

(3) Third Embodiment

A tracking monitor camera will be next explained as a third embodiment.

The tracking monitor camera basically has the system configuration identical to that illustrated in FIG. 5. In addition, the mobile object combination determination unit 101 and the TV camera 110 are connected such that the determination unit may send control information for tracking to a controller of the TV camera 110. Alternatively, a dedicated tracking camera may be provided other than the TV camera 110, and connected to the mobile object combination determination unit 102.

Figure 10:
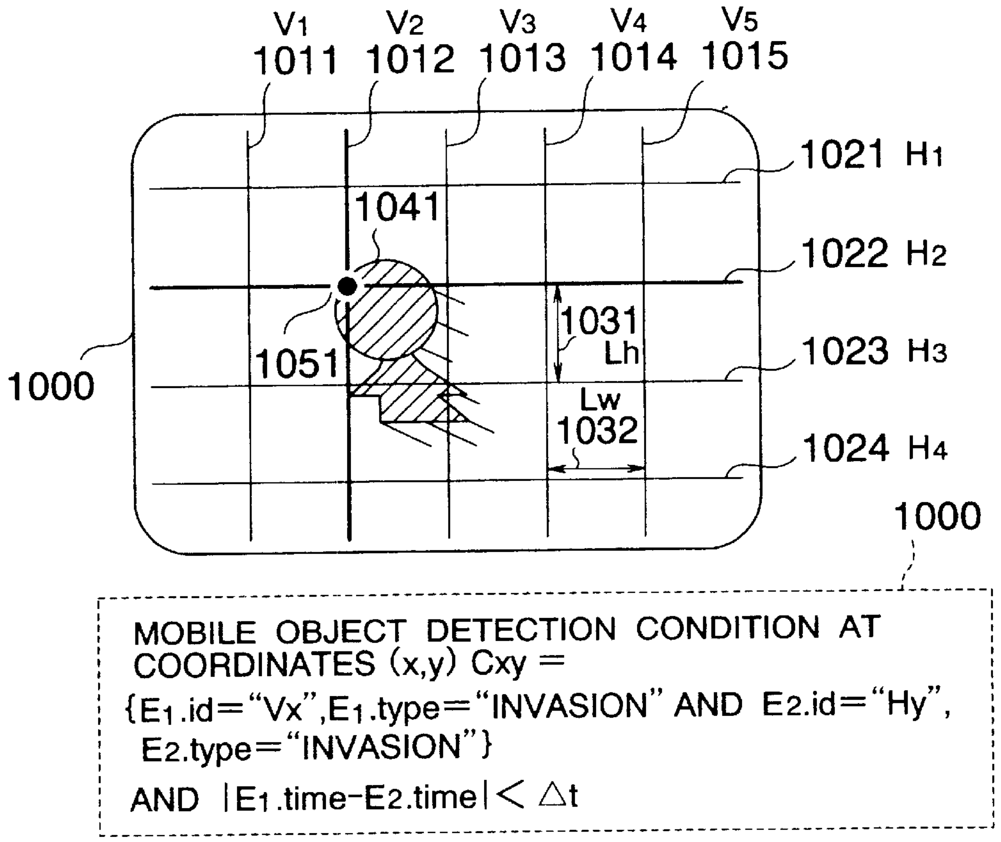
FIG. 10 is a diagram for explaining a method of arranging lattice-like slits and a method of determining the position of a mobile object, for use in a tracking monitor camera in a third embodiment of the present invention.

FIG. 10 is a diagram for explaining a method of positioning slits to form a lattice, which may be used in the tracking monitor camera, and a condition for determining the position of a mobile object using the slits. In this embodiment, groups of slits (1011–1015, 1021–1024), which are arranged to form a lattice, are used to detect a vertical position and a horizontal position of a mobile object 1041 which exists within an image 1000 inputted from a TV camera.

The groups of slits consists of a vertical slit group including a plurality of vertically oriented slits, i.e., a slit V1 (1011), a slit V2 (1012), a slit V3 (1013), a slit V4 (1014) and a slit V5 (1015); and similarly, a horizontal slit group comprising a plurality of horizontally oriented slits, i.e., a slit H1 (1021), a slit H2 (1022), a slit H3 (1023) and a slit H4 (1024). These slits V1–V5 and H1–H4 are arranged orthogonally to each other to form the lattice-like slits. The respective slits in the vertical slit group are aligned in parallel with each other at intervals of a width Lw (1032). Similarly, the respective slits in the horizontal slit group are aligned in parallel with each other at intervals of a height Lh (1031).

The system configuration illustrated in FIG. 5 includes the number of video input units and mobile object detection units equal to the total number of slits for realizing the lattice-like slits. Assume that each of the mobile object detection units issues an event at the same timing as the first embodiment. Also, as a slit identifier of the mobile object detection information (event), the mobile object detection unit sets a character string corresponding to the label of each slit such as "V1", "V2", "H1", "H4" or the like for identifying one by one the slits illustrated in FIG. 10.

Explanation is next given of a method of determining the position at which a mobile object exists using the group of slits described above. When a mobile object exists on an intersection 1051 of the slit V2 (1012) and the slit H2 (1022), a mobile object "invasion" event occurs both at the slit V2 (1012) and at the slit H2 (1022). In this way, it can be seen that when a mobile object exists at an intersection of a slit "Vx" and a slit "Hy" (x=1–5, y=1–4), an "invasion" event occurs both at the slit "Vx" and the slit "Hy". Here, the notation "Vx" represents a slit identifier which varies with the value of the number x as "V1", "V2", "V3", "V4" and "V5". Similarly, the notation "Hy" represents a slit identifier for identifying "H1", "H2", "H3" or "H4". In the following, when a slit is designated in a similar notation, this implies the same meaning as mentioned here.

In summarizing the foregoing, a mobile object detection condition Cxy (1001) at a position (x, y) is defined in the following manner using mobile object detection information E1, E2 associated with two certain events: "E1.id="Vx", E1.type="invasion" AND E2.id="Hy", E1.type="invasion" AND |E1.time-E2.time|<Δt". Here, "|E1.time-E2.time|<Δt" represents a restricting condition meaning that the mobile object detection event E1 and the mobile object detection event E2 occurred substantially at the same time. For Δt, a fixed value is previously set.

Figure 11:
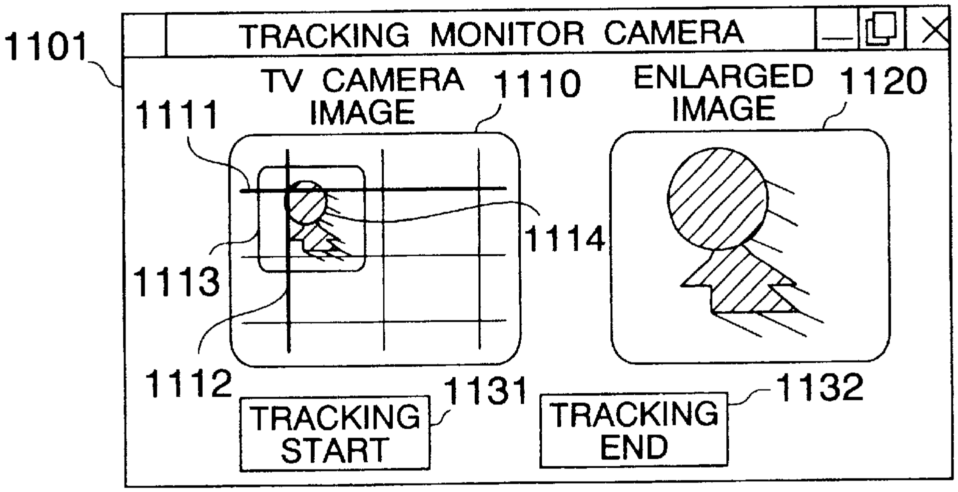
FIG. 11 illustrates an example of a display on a screen of the tracking monitor camera which employs the method of determining the position of a mobile object in the third embodiment.

FIG. 11 illustrates an example of a displayed screen for the tracking monitor camera which utilizes the mobile object position determination method explained above with reference to FIG. 10. A window 1101 implementing the tracking monitor camera includes a field 1110 for displaying a video image inputted from the TV camera; an enlarged image display field 1120 for displaying in an enlarged view only a portion 1113, in which a mobile object 1114 exists, within the video of the TV camera; a tracking start button 1131 for staring mobile object tracking processing; and a tracking end button 1132 for ending the mobile object tracking processing. Lines drawn in lattice, displayed in the TV camera image display field 1110 (lines 1111 and 1112 and other lines drawn in parallel therewith) represent the slits.

Figure 12:
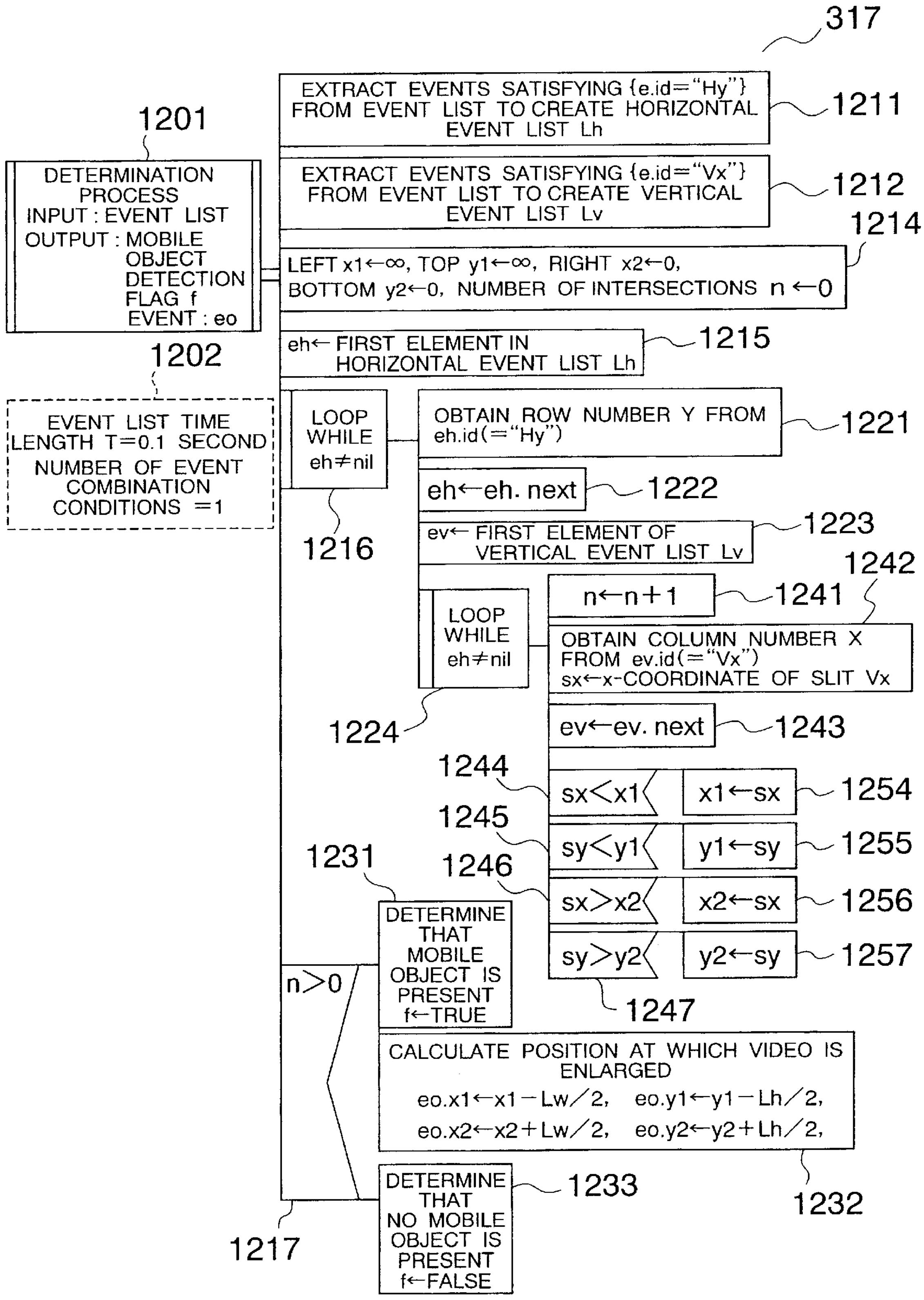
FIG. 12 is a processing flow diagram illustrating the processing for determining a mobile object event combination for the tracking monitor camera in the third embodiment.

FIG. 12 describes in detail the event combination condition determination processing. A procedure 1201 is called from step 317 in the processing flow executed by the mobile object combination determination unit illustrated in FIG. 3. An input to this procedure 1201 is an event list for past T seconds, and outputs resulting from the procedure 1201 are a mobile object presence/absence detection flag f and mobile object detection information eo. In the tracking monitor camera of this embodiment, the time length T of the event list is set to an extremely short time of 0.1 second, and the number of event combination conditions is specified to be one (1202).

The procedure 1201 is generally made up of two processing portions: processing for classifying events in the event list into a vertical event list for storing events associated with the vertical slit group and a horizontal event list for storing events associated with the horizontal slit group; and processing for subsequently determining the position at which a mobile object exists from a combination of the horizontal and vertical event lists thus classified.

First, while scanning the event list from the top to the bottom, the procedure 1201 extracts only detection events at horizontal slits which can be identified by the identifier set to "Hy" in elements e stored in the list, and creates a new event list Lh based on the result of the extraction (1211). Similarly, the procedure 1201 extracts from the event list only detection events at vertical slits which can be identified by the identifier set to "Vx" in elements e stored in the list, and creates a new event list Lv based on the result of the extraction (1212).

Subsequently, the steps described below are executed to determine the position at which a mobile object exists from combinations of classified vertical and horizontal event lists. Generally, there are a plurality of intersections of vertical and horizontal slits at which a mobile object exists (for example, an intersection (1051) of the slit V2 (1012) and the slit H2 (1022) in FIG. 10, and so on). The subsequent processing is performed to calculate a minimum rectangular region including a plurality of these intersections of slits, and substitute the values defining the rectangular region into variables x1 (indicative of the left position of the rectangle), y1 (indicative of the top position of the same), x2 (indicative of the right position of the same), and y2 (the bottom position of the same).

At step 1214, the variables x1, y1, x2, y2, representative of the rectangular region, and the number n of intersections of slits are initialized (1214). For calculating a minimum rectangular region at subsequent steps, x1 is initialized to ∞; y1 to ∞; x2 to zero; and y2 to zero. Also, the number n of intersections is set to zero.

Next, the first element in the horizontal event list Lh is substituted into a temporary variable eh (1215), and a loop (1216) is executed to read events from the horizontal event list Lh up to the last element stored therein (1216). Since the last element in the horizontal event list also has the pointer value set to nil, the loop is repeated until nil is encountered in the temporary variable eh.

In the loop (1216) for the horizontal event list, a row number y of a horizontal slit is found from the identifier id (which must be set to "Hy" since the detection events having the identifier id set to "Hy" have been classified and stored in the horizontal event list) of detection information eh associated with a mobile object detection event. Then, the y-coordinate of the slit "Hy" is derived from the row number y and substituted into a variable sy (1221). For deriving the y-coordinate from the slit "Hy", identifiers of the respective slits and their x- and y-coordinates may be listed, for example, in a table form, such that the table is searched with a key which may be a row number of a slit derived from the event information eh or the identifier of the event information eh, to retrieve the x- and y-coordinates of the slit from the table.

At step 1222, the next pointer eh.next of the event information eh is substituted into the temporary variable eh for sequentially reading an event stored in the horizontal event list (1222).

At next steps 1223, 1224, a processing loop is executed for all elements in the vertical event list Lv. First, the first element in the vertical event list Lv is substituted into a variable ev (1223), and the loop is executed to read the vertical event list to the last element thereof until nil is encountered in the variable ev (1224).

In the loop of reading an element from the vertical event list, rectangular region calculation processing is performed on the assumption that an intersection of a vertical slit and a horizontal slit is found. First, the variable n indicative of the number of intersections is incremented by one (1241). Next, the row number x of the vertical slot is derived from the identifier id (which must be set to "Vx" since the detection events having the identifier id set to "Vx" have been classified and stored in the vertical event list) of mobile object detection information ev associated with a mobile object detection event. Then, the x-coordinate of the slit "Vx" is derived from the row number x, and substituted into a variable sx (1242). For implementing this step, an approach similar to that employed at step 1221 may be applied.

At step 1243, the next pointer ev.next of the event information ev is substituted into the variable ev for sequentially reading an event stored in the vertical event list (1243). Subsequent steps perform processing for updating a minimum rectangular region in which a mobile object exists, based on the coordinates sx, sy of the intersection of the slits derived at steps 1221, 1242.

For updating the left position of the rectangular region, if the slit intersection position sx is smaller than the current left position x1 (1244), the value of the current left position x1 is replaced by the value of the slit intersection position sx (1254).

For updating the top position of the rectangular region, if the slit intersection position sy is smaller than the current top position y1 (1245), the value of the current top position y1 is replaced by the value of the slit intersection position sy (1255).

For updating the right position of the rectangular region, if the slit intersection position sx is larger than the current right position x2 (1246), the value of the current right position x2 is replaced by the value of the slit intersection position sx (1256).

For updating the bottom position of the rectangular region, if the slit intersection position sy is larger than the current bottom position y2 (1247), the value of the current bottom position y2 is replaced by the value of the slit intersection position sy (1257).

By executing the two loops 1216, 1224 described above, consequently derived are the number n of intersections of vertical and horizontal slits and a minimum rectangular region defined by x1, y1, x2, y2, in which the mobile object exists.

As the last processing of the main procedure 1201, the presence or absence of a mobile object is determined. When the number n of the intersections of vertical and horizontal slits is larger than zero (1217), it is determined that a mobile object exists, and the mobile object presence/absence detection flag f is set to true (1231). Next, the position, at which a portion of the image is enlarged by the tracking camera, is calculated on the basis of the previously derived minimum rectangular region, and the result is set to mobile object detection information eo associated with the mobile object detection event to be outputted (1232). For a region, in which a portion of the image is enlarged, a marginal region equal to one half of Lh (1031) in FIG. 10, which is the interval between the vertical slits, is added to each of the top and bottom of the previously derived minimum rectangular region, and similarly, a marginal region equal to one half of Lw (1032) in FIG. 10, which is the interval between horizontal slits is added to each of the left and rights of the minimum rectangular region.

When the value of the number n of intersections of vertical and horizontal slits is zero (1217), it is determined that no mobile object exists, and the mobile object presence/absence detection flag f is set to false (1233).

By providing the processing for determining event combination conditions, the mobile object detection combination determination unit 101 in FIG. 5 issues a mobile object detection event when a mobile object exists within the video. When the mobile object detection event is issued, the result output unit 103 performs required digital signal processing to display a portion of a video inputted from the TV camera in an enlarged view, as an enlarged video region 1120 in FIG. 11, in accordance with an enlarged video region stored in the mobile object detection information.

Of course, instead of the configuration described above, the coordinate information may be transmitted to an additional high definition TV camera or high definition digital still camera, previously provided, to separately image a region, which has been specified to be enlarged, in greater detail.

It is further possible to feed a difference vector between the x- and y-coordinates of the center of the rectangular region 1113 including a mobile object and the x- and y-coordinates of the center of the video 1120 produced by the TV camera back to the controller of the TV camera from the determination unit to control the orientation and a zooming ratio of the TV camera. In this case, however, when the TV camera is moved, the underlying background image is also updated. It is therefore necessary to newly update the background when the TV camera has been moved by once terminating the tracking processing and again starting the tracking processing, or by any other appropriate processing. In an alternative, the x- and y-coordinates of the centroid of slit intersections may be used instead of the x- and y-coordinates of the center of the rectangular region including a mobile object for calculating the difference vector. For calculating the x- and y-coordinates of the centroid, the coordinates (sx, sy) of an intersection of slits are accumulated each time the loop 1224 in FIG. 12 is repeated, and then the accumulated x- and y-coordinates are divided by the number of slit intersections after the loop exits.

(4) User Interface (I/F) for Setting Slits

Figure 13:
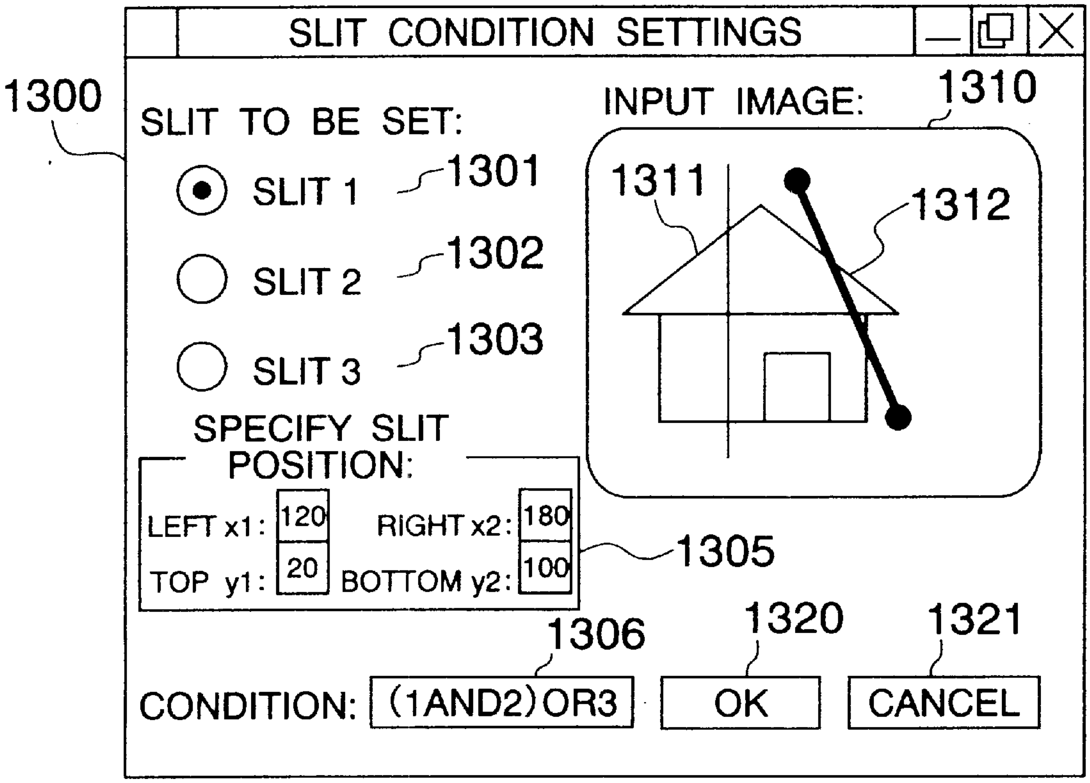
FIG. 13 illustrates an example of a display for setting conditions for a plurality of slots in the present invention.

FIG. 13 illustrates an embodiment of a screen on which conditions for a plurality of (in this case, three) slits are set. A slit condition setting screen (1300) includes a check button 1 (1301), a check button 2 (1302) and a check button 3 (1303) for specifying the number of a slit to be selected presently; an edit box field (1305) having edit boxes for inputting the coordinates of a slit; a field (1310) for displaying an input image and positions of slits; an edit box (1306) for specifying a slit combination condition; an OK button (1320) for expressing acceptance of settings made on the screen; and a cancel button (1321) for canceling settings so far made. The input video display field (1310) displays currently specified slits (1311, 1312), where a selected slit (1312) of the two is emphasized with a bold line or the like. The check button 1-3 (1301, 1302, 1303) for specifying a slit number is designed such that only one of them can be selected.

On this screen, a condition for three slits can be set. Next, a method of manipulating the screen will be explained in brief. First, a check button (1301, 1302, 1303) is specified to select a slit for which a condition is presently set. In this event, the current left (variable x1), top (y1), right (x2) and bottom (y2) coordinate values of the slit are displayed in the edit boxes 1305, so that the user may modify the numerical values as required. The user may also specify another check button (1301, 1302, 1303), if necessary, to modify the next slit information. For setting a plurality of slit combination conditions, a conditional expression is described in the edit box (1306) using slit numbers "1", "2", "3" and logical operators such as "AND" and "OR". The slit combination condition shown in FIG. 13 describes "(1 AND 2) OR 3" which means "when mobile objects are detected at slit 1 and slit 2, or when a mobile object is detected at a slit 3".

Figure 14:
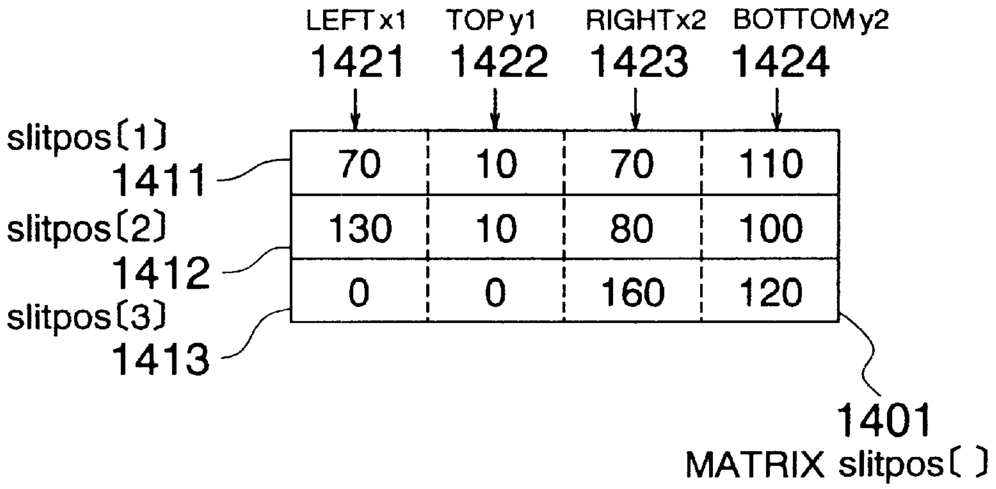
FIG. 14 shows a matrix structure for slit position information set on a slit condition specifying screen illustrated in FIG. 13.

FIG. 14 shows a matrix structure of slit position information used in this embodiment. The matrix slitpos[] (1401) for storing slit position information is structured such that each element thereof indicates positional information of a slit. Specifically, each element of the matrix (1401) stores a left position (1421, element x1), a top position (1422, element y1), a right position (1423, element x2) and a bottom position (1424, element y2) of a slit. The matrix 1401 in FIG. 14 stores position information slitpos[1] (1411) on the slit 1, position information slitpos[2] (1412) of the slit 2, and position information slitpos[3] (1413) of the slit 3.

Figure 15:
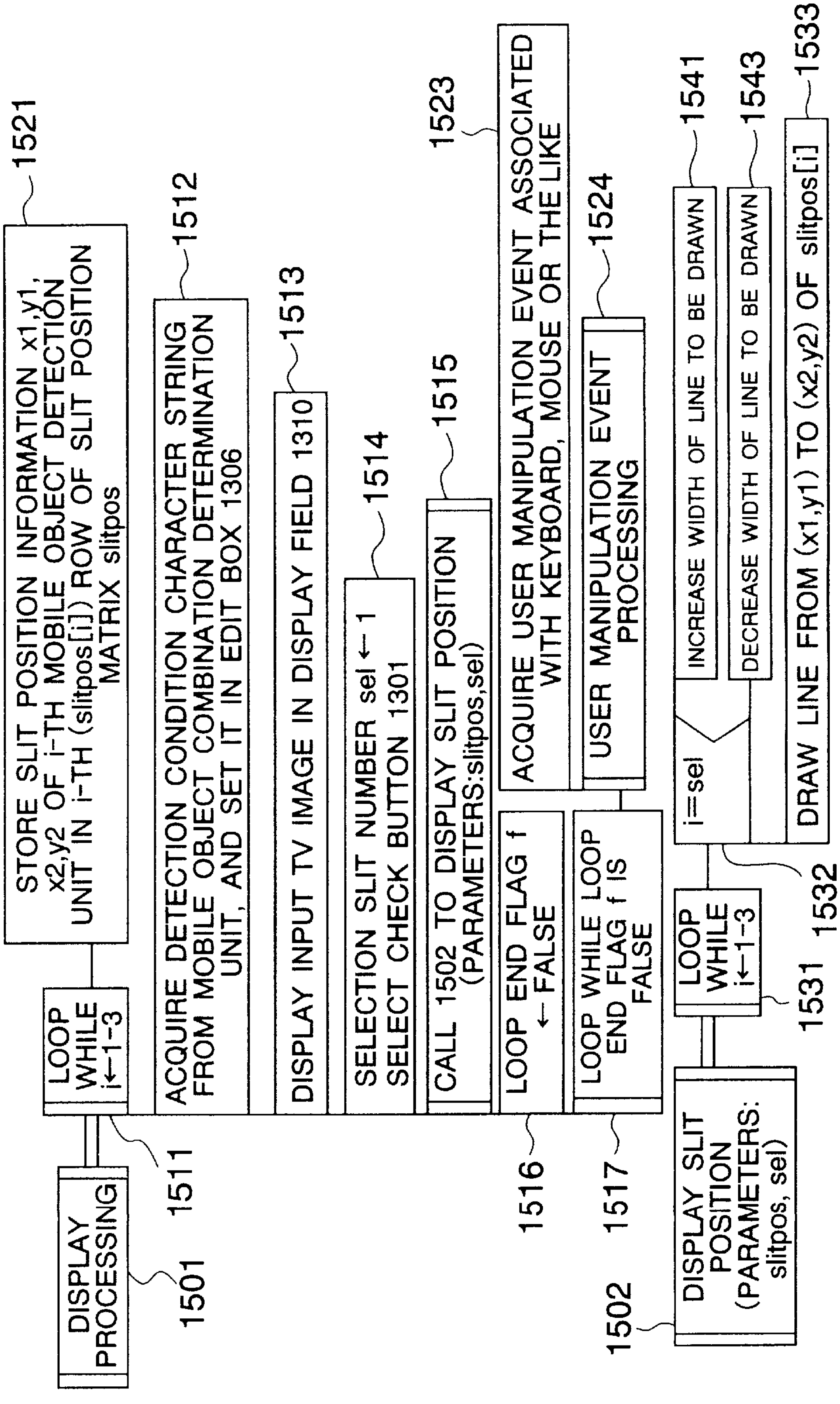
FIG. 15 is a processing flow diagram illustrating the screen processing performed on the slit condition specifying screen.
Figure 16:
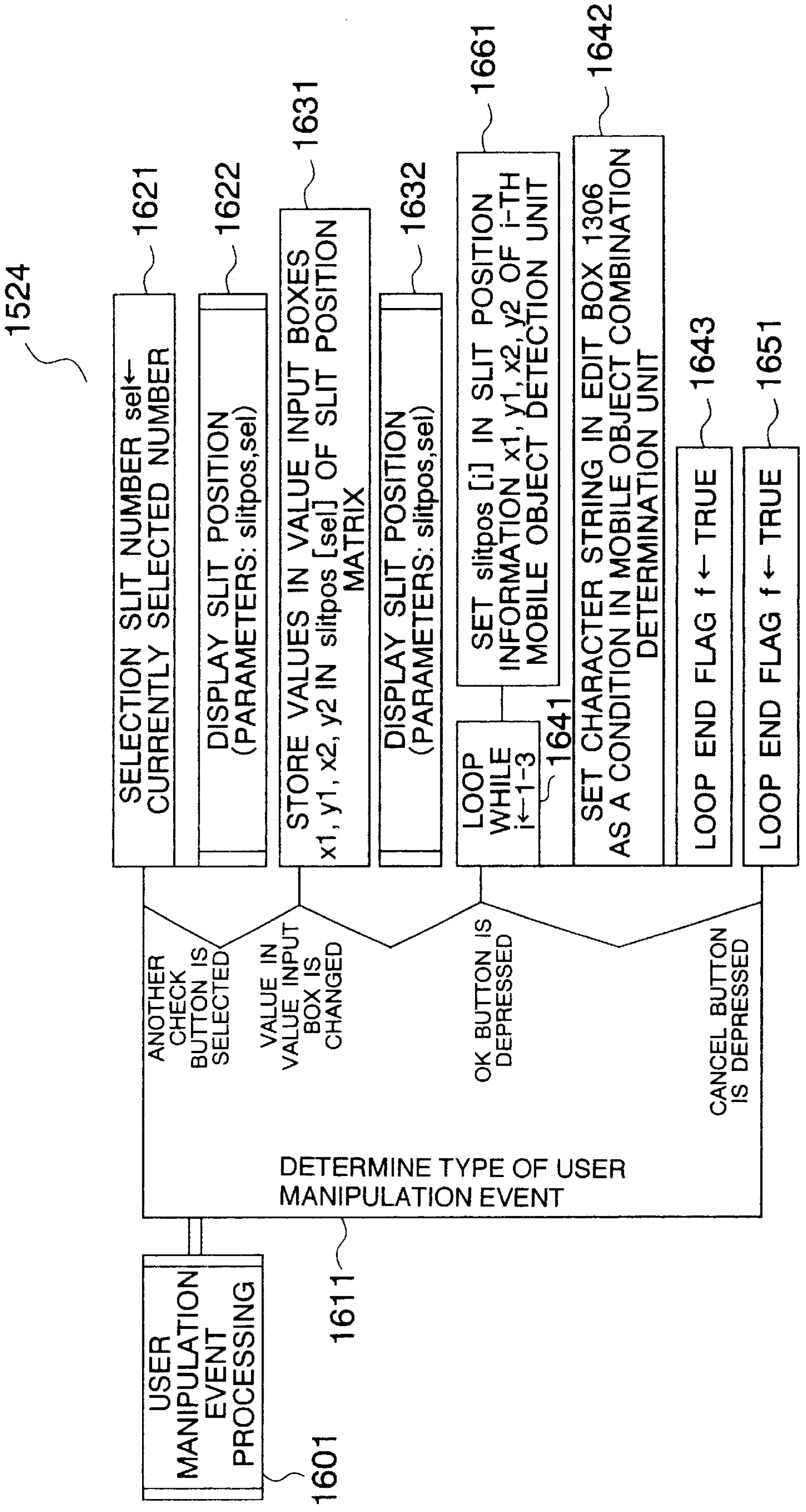
FIG. 16 is a processing flow diagram corresponding to a user manipulation event in the screen processing flow illustrated in FIG. 15.

FIGS. 15 and 16 illustrate processing flows associated with a method of inputting the position of a slit.

A screen display processing flow will be first explained with reference to FIG. 15. This processing is performed in the mobile object combination detection apparatus (100) (FIG. 1). Alternatively, this processing may be executed by a CPU constituting the mobile object combination determination unit and the result output unit. When the user is to set a slit condition, the screen 1300 illustrated in FIG. 13 is displayed, and display processing (1501) is executed. First, a loop (1511) is executed to acquire slit position information currently set by the mobile object combination detection apparatus, i.e., information on settings of a plurality of mobile object detection units and store them in the matrix slitpos. In the loop (1511, using a loop counter i), slit position information on an i-th mobile object detection unit is set in the variables x1 (in a column 1421 in FIG. 14), y1 (in a column 1422), x2 (in a column 1423), and y2 (in a column 1424) of the slit position matrix slitpos[i]. Next, a character string describing a detection condition currently set and stored in a memory is fetched from the mobile object combination determination unit, and set in the edit box 1306 (1512). Next, a video image inputted from the TV camera is always displayed in the input video display field 1310 (1513). Subsequently, for initializing a currently selected slit number, one is set to a selected slit number sel, and a selected state of the check button 1301 is set to ON (1514). Then, slit display processing 1502 is called for displaying the current slit position, using the matrix slitpos, in which the slit position information has been previously set, and the selected slit number sel as parameters (1515). As a final step of the display processing, operations corresponding to manipulations made by the user on the screen are repeated until the OK button (1320) or the cancel button (1321) is depressed. For this step, a loop end flag f is provided. The loop end flag f is initialized to be false before the loop is started (1516), and the loop is repeated until the loop end flag f changes to true (1517). The loop end flag f transitions to true when the OK button (1320) or the cancel button (1321) is depressed. In the loop, after a user manipulation event associated with a keyboard or a mouse is acquired (1523), the processing corresponding to the user manipulation event is performed (1524). In the slit position display processing (1502), a loop (1531, using a loop counter i) is repeated three times to display three slits. In the loop 1531, the slit number i of a slit to be displayed is first compared with a currently selected slit number sel (1532). If the slit to be displayed is equal to the currently selected slit, the slit is drawn in bold line (1541). Otherwise, the slit is drawn in fine line (1543). It is possible to set a different size for a line to be drawn, for example, by changing a drawing attribute of an operating system. After changing the size of the line to be drawn, a line is drawn from coordinates (x1, y1) to coordinates (x2, y2) on the input TV video display field (1310) in accordance with the values in the i-th slot position information slitpos[i].

FIG. 16 illustrates a processing flow corresponding to a user manipulation event (1524) when the screen is displayed by the processing of FIG. 15. In He the user manipulation event processing (1601), the type of a user event is first determined to perform appropriate processing corresponding to the determined user manipulation event (1611). When a check button (1301, 1302, 1303) having not been selected is selected to specify a slit number, the selected slit number sel is updated to the number of the just selected check button (1621), and the newly specified slit is drawn (1622). When the value in any of the slit position specifying edit boxes (1305) is changed, the changed value in the edit box x1, y1, x2 or y2 is stored in slitpos[sel] in the slit position matrix slitpos (1631). Subsequently, the slit is again drawn at a changed position (1632). When the OK button (1320) is depressed, a loop (1641, using a loop counter i) is executed for three slots to set the position information x1, y1, x2, y2 of slitpos[i] as slit position information in an i-th mobile object detection unit (1661). Then, a character string inputted in the edit box 1306 for setting a detection condition is set as a condition in the mobile object combination determination unit (1642).

The condition may be such one that limits the values in elements of the event list, as previously described in Sections (1), (2), (3), or may be in a more abstract form such as the aforementioned "(1 AND 2) OR 3)". In the latter case, the condition character string may be transformed into tree-structured data representative of a conditional expression by well known syntactic analysis processing used in a compiler or the like, and the tree-structured data may be set in the mobile object combination determination unit.

After updating the slit position information for the mobile object detection unit and the detection condition for the mobile object combination determination unit, the loop end flag f is set to true (1643), thereby terminating the user manipulation event processing loop (1516). When the cancel button (1321) is depressed, the loop end flag f is set to true without updating the slit position information for the mobile object detection unit (1651), thus terminating the user manipulation event processing loop (1516).

While an embodiment of the slit condition setting screen of FIG. 13 for setting conditions for a plurality of slits has been described above, such a slit condition setting screen may be realized in alternative embodiments as follows, other than the one described above. For example, instead of the process of specifying the coordinates of the position of a slit using the edit boxes 1305 for specifying the position of a slit, the position of a slit line may be directly specified by dragging a mouse on the input video image display field 1310. In this event, a drag start point and a drag end point may be set as right, left, top and bottom positions of a slit.

The input video display field 1310 may display one specific frame image within a video image from the TV camera at the time the setting screen is displayed, rather than the video image from the TV camera as mentioned above. By displaying a still image instead of a video image, the computer can be burdened with a less processing load.

As another embodiment, a conditional sentence, which is entered in the edit box 1306 for specifying a mobile object combination condition, may be used to specify a temporally restrictive condition such as "1 after 2". This conditional sentence represents that "the slit 1 detected a mobile object after the slit 2 had detected a mobile object". This condition may be realized by the processing for searching for a corresponding slit identifier by scanning past events on the event list, as shown in "the method of determining a moving direction and a speed of a mobile object using two slit" in the second embodiment.

Figure 17:
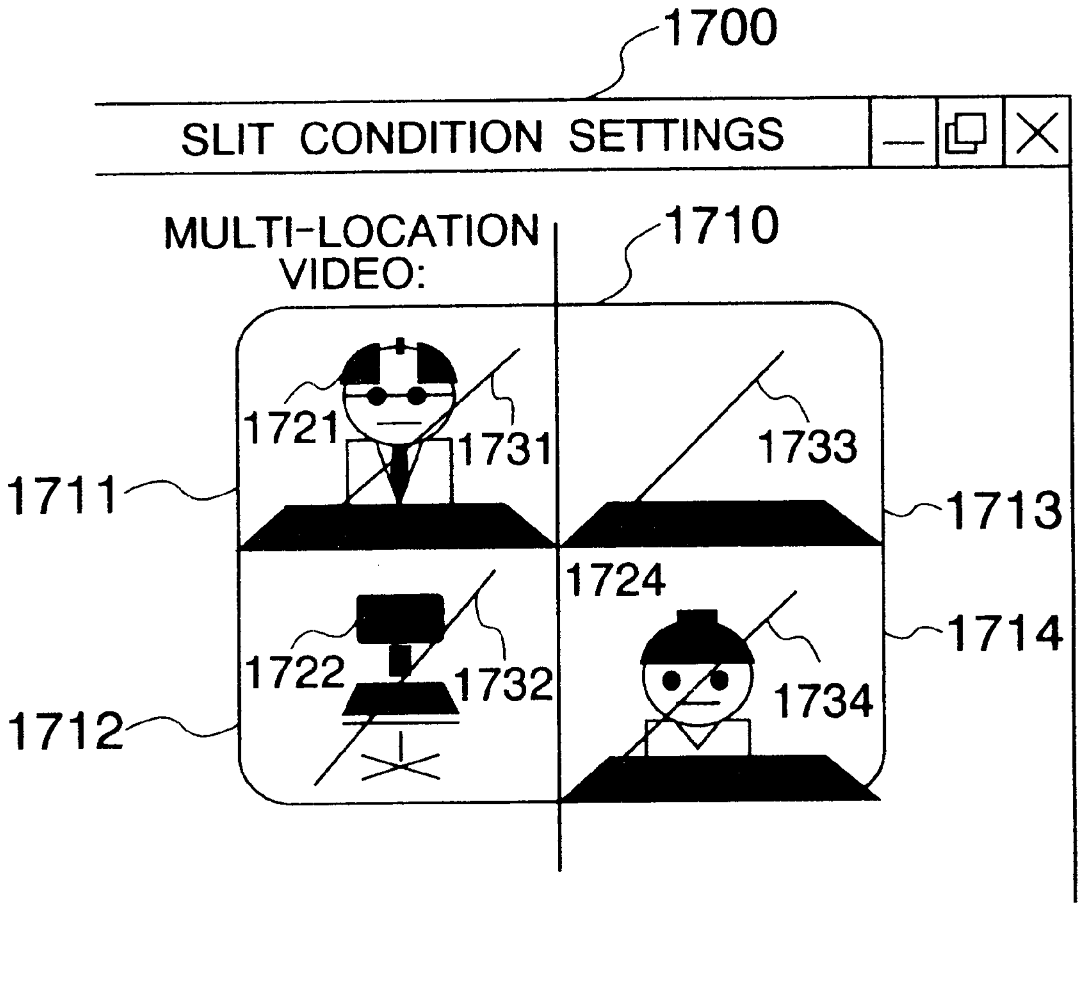
FIG. 17 illustrates an example of the slit condition specifying screen when a plurality of images are inputted.

A further embodiment may be a setting screen for setting conditions for a plurality of slits for use in the case where a plurality of video images are supplied from TV cameras instead of a single video image, as illustrated in FIG. 17. Such settings of slit conditions on a plurality of input video images may be required for TV video images in a TV conference system, a centralized monitoring station, and so on. FIG. 17 illustrates a portion of a screen for setting conditions for slits in a plurality of TV conference video images, wherein the input video display field 1310 in FIG. 13 is modified to serve as a multi-location video display field 1710. The multi-location video display field 1710 displays video images (1711, 1712, 1713, 1714) at four locations in a TV conference, and indicates the positions of four slits (1731, 1732, 1733, 1734) in the respective video images.

In the video images in a TV conference as illustrated in FIG. 17, a condition is set to represent that all conference members are seated. First, 'an "invasion" event occurs at a slit 1731, and then a background update event occurs at the slit 1731 due to a person remaining seated' is defined as a condition which defines that a person is seated at a location which is imaged in an input video 1711. Thus, the condition requiring that all conference members are seated can be defined as the case where the same condition as the foregoing is met at all of the four slits (1731, 1732, 1733, 1734) included in the four input video images (1711, 1712, 1713, 1714).

Other than the alternative embodiments described above, the mobile object combination detection apparatus according to the present invention can be applied to a variety of applications by simply varying the positions of slits and mobile object combination conditions.

What is claimed is:

1. A mobile object combination detection apparatus comprising:

a plurality of moving image input means;

a plurality of mobile object detection means each connected to one of said moving image input means; and combination determination means;

wherein each of said plurality of mobile object detection means detects a mobile object at a predetermined position on a moving image inputted thereto from said moving image input means as changing information of a predetermined area within an image from said moving image input means, and sends the changing information as detection information to said combination determination means; and said combination determination means combines said changing information as the detection information sent from said mobile object detection means and compares the detection information on the mobile object sent thereto from each of said mobile object detection means with a predetermined condition to determine that a target mobile object is detected when said detection information satisfies said predetermined condition;

wherein said plurality of moving image input means are all connected to a single moving image camera to input the same moving image; and each of said mobile object detection means detects a mobile object at a different position on the same moving image inputted thereto from said moving image input means.

2. A mobile object counting apparatus comprising:

a moving image camera;

two moving image input means connected to said moving image camera;

two mobile object detection means each connected to one of said moving image input means; and combination determination means, wherein said two mobile object detection means each detect a mobile object at corresponding one of positions of two vertical slits, arranged in parallel with each other, on a moving image inputted thereto from said moving image input means, and respectively send a slit identifier, detection time and an image at the slit at the time of detection to said combination determination means; and said combination determination means recognizes that the same mobile object has passed said two slits, calculates a moving direction and a moving speed of said mobile object, and counts the number of passing mobile objects based on the slit identifiers, detection times of mobile objects, and images at the slits at the time of detection sent thereto from said two mobile object detection means.

3. A tracking apparatus comprising:

a moving image camera;

a plurality of moving image input means connected to said moving image camera;

a plurality of mobile object detection means each connected to one of said plurality of moving image input means; and combination determination means, wherein said plurality of mobile object detection means each detect a mobile object at each of a plurality of vertical slit positions and a plurality of horizontal slit positions on a moving image inputted thereto from said moving image input means, said vertical slits and said horizontal slits being arranged in lattice, and said plurality of mobile object detection means each send a slit position identifier and detection time of a mobile object to said combination determination means; and said combination determination means identifies which of intersections of said lattice-like slits a mobile object has invaded, based on the slit position identifiers and detection times of mobile objects sent thereto from said mobile object detection means, and outputs the position of the mobile object on said moving image, and the size of the mobile object as information for use in tracking.

* * * * *